(12) United States Patent
Allen

(10) Patent No.: US 7,316,119 B2
(45) Date of Patent: Jan. 8, 2008

(54) HVAC SYSTEM FOR TRUCK SLEEPERS

(75) Inventor: Kendall E. Allen, Ruther Glen, VA (US)

(73) Assignee: Dometic Environmental Corporation, Pompano Beach, FL (US)

(*) Notice: Subject to any disclaimer, the term of this patent is extended or adjusted under 35 U.S.C. 154(b) by 74 days.

(21) Appl. No.: 11/049,259

(22) Filed: Feb. 2, 2005

(65) Prior Publication Data
US 2005/0210903 A1    Sep. 29, 2005

Related U.S. Application Data

(60) Provisional application No. 60/556,256, filed on Mar. 25, 2004.

(51) Int. Cl.
*F25B 27/00* (2006.01)
(52) U.S. Cl. .......................... 62/236; 62/244
(58) Field of Classification Search ............. 62/236, 62/244
See application file for complete search history.

(56) References Cited

U.S. PATENT DOCUMENTS

| 4,051,691 | A | 10/1977 | Dawkins |
| 4,674,294 | A | 6/1987 | D'Agaro |
| 4,732,229 | A | 3/1988 | Lucht |
| 4,762,170 | A | 8/1988 | Nijjar et al. |
| 4,825,663 | A | 5/1989 | Nijjar et al. |
| 4,945,977 | A | 8/1990 | D'Agaro |
| 5,333,678 | A | 8/1994 | Mellum et al. |
| 5,899,081 | A * | 5/1999 | Evans et al. ............ 62/126 |
| 6,932,148 | B1 * | 8/2005 | Brummett et al. ....... 165/43 |
| 2003/0034147 | A1 * | 2/2003 | Houck et al. ............ 165/42 |

* cited by examiner

*Primary Examiner*—William E. Tapolcai
(74) *Attorney, Agent, or Firm*—Pearne & Gordon LLP (57) ABSTRACT

A vehicle comprises an interior area including a driver compartment and a sleeper compartment. The vehicle includes a first apparatus adapted to provide occupant comfort air at least in the driver compartment. The vehicle further includes a second apparatus adapted to provide occupant comfort air at least in the sleeper compartment.

19 Claims, 3 Drawing Sheets

HVAC SYSTEM FOR TRUCK SLEEPERS

CROSS-REFERENCE TO RELATED APPLICATIONS

This application claims the benefit of U.S. Provisional Application No. 60/556,256 filed on Mar. 25, 2004, which is entirely incorporated herein by reference.

FIELD OF THE INVENTION

The present invention is directed in general to a heating, ventilating, and air conditioning (HVAC) system for a vehicle, and more particularly to a first apparatus adapted to provide desired occupant comfort air at least in the driver compartment of a vehicle and a second apparatus adapted to provide desired occupant comfort air in the sleeper compartment of a vehicle.

BACKGROUND OF THE INVENTION

Motor vehicles, such as a long distance or over the road trucks may not be configured to readily provide HVAC needs when parked. Specifically, such vehicles may not provide for a desired HVAC, when the vehicles are not being driven. For example, if the vehicle is parked and HVAC is desired, the engine of the vehicle, which drives an associated engine-driven air-conditioning unit, heat exchanger, etc. may need to be operated. This results in air pollution, sound pollution, and engine wear concerns. As such, there is some need to address issues concerning HVAC needs when the vehicle is stationary.

Reconfiguring a vehicle to include additional HVAC equipment may be labor intensive and may require cutting, fitting, or other modification of existing parts. Space constraints within the vehicle may also be problematic. Further there is a need for an HVAC system for the sleeper compartment that can function regardless of whether the vehicle engine is running and/or can operate on alternative power sources.

SUMMARY OF THE INVENTION

In accordance with one aspect, a vehicle comprises an interior area including a driver compartment and a sleeper compartment. The vehicle includes a first apparatus that is adapted to provide occupant comfort air at least in the driver compartment. The first apparatus includes a first apparatus fan. The vehicle further comprises a ground-engaging wheel and a power source adapted to power the first apparatus and the ground-engaging wheel when the power source is operating. The vehicle further comprises a second apparatus adapted to provide occupant comfort air at least in the sleeper compartment. The second apparatus includes a first heat transfer device, a second heat transfer device and a second apparatus fan adapted to facilitate air flow with respect to the first and second heat transfer devices to provide conditioned air at least in the sleeper compartment. The first and second heat transfer devices are either both adapted to heat or both adapted to cool the sleeper compartment. The vehicle further comprises a control mechanism adapted to permit operation of the second heat transfer device and prevent operation of the first heat transfer device when the power source is operating and adapted to permit operation of the first heat transfer device and prevent operation of the second heat transfer device when the power source is not operating.

In accordance with another aspect, a vehicle comprises an interior area including a driver compartment and a sleeper compartment. The vehicle further comprises a first apparatus adapted to provide occupant comfort air at least in the driver compartment. The vehicle also includes a ground-engaging wheel and a power source adapted to power the first apparatus and the ground-engaging wheel when the power source is operating. The vehicle further includes a second apparatus adapted to provide occupant comfort air at least in the sleeper compartment, wherein the second apparatus is adapted to operate entirely on an AC power supply and wherein the second apparatus is further adapted to operate entirely on a DC power supply.

In accordance with still another aspect, a vehicle comprises an interior area including a driver compartment and a sleeper compartment. The vehicle includes a first apparatus adapted to provide occupant comfort air at least in the driver compartment. The first apparatus comprises a first heater unit including a heat exchanger and a fluid pump adapted to circulate fluid through the heat exchanger. The first apparatus further includes a first air cooling unit including a compressor, a condenser coil, a condenser fan, and an evaporator coil. The first apparatus further comprises a first apparatus fan adapted to facilitate air flow with respect to the heat exchanger and the evaporator coil. The vehicle further includes a ground-engaging wheel and a power source adapted to power the fluid pump, the compressor, the condenser fan, the first apparatus fan and the ground-engaging wheel when the power source is operating. The power source also includes a fluid coolant circuit in fluid communication with the heat exchanger. The vehicle also comprises a second apparatus adapted to provide occupant comfort air at least in the sleeper compartment. The second apparatus comprises a second heater unit including an electrical heating element and another heat exchanger operably connected to the fluid coolant circuit of the power source. The second apparatus further comprises a second air cooling unit including an auxiliary compressor, an auxiliary condenser coil, an auxiliary condenser fan, a first auxiliary evaporator coil operably connected between the auxiliary condenser coil and the auxiliary compressor, and a second auxiliary evaporator coil operably connected between the condenser coil of the first apparatus and the compressor of the first apparatus. The second apparatus further includes a second apparatus fan adapted to facilitate air flow with respect to the electrical heating element, the heat exchanger of the second apparatus, the first auxiliary evaporator coil and the second auxiliary evaporator coil. The second apparatus fan, the electrical heating element, the auxiliary compressor and the auxiliary condenser fan are adapted to operate entirely on an AC power supply and also adapted to operate entirely on a DC power supply.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF EXAMPLE EMBODIMENTS

Certain terminology is used herein for convenience only and is not to be taken as a limitation on the present invention. Further, in the drawings, the same reference numerals are employed for designating the same elements, and in order to clearly and concisely illustrate the present invention, certain features may be shown in somewhat schematic form.

Figure 1:
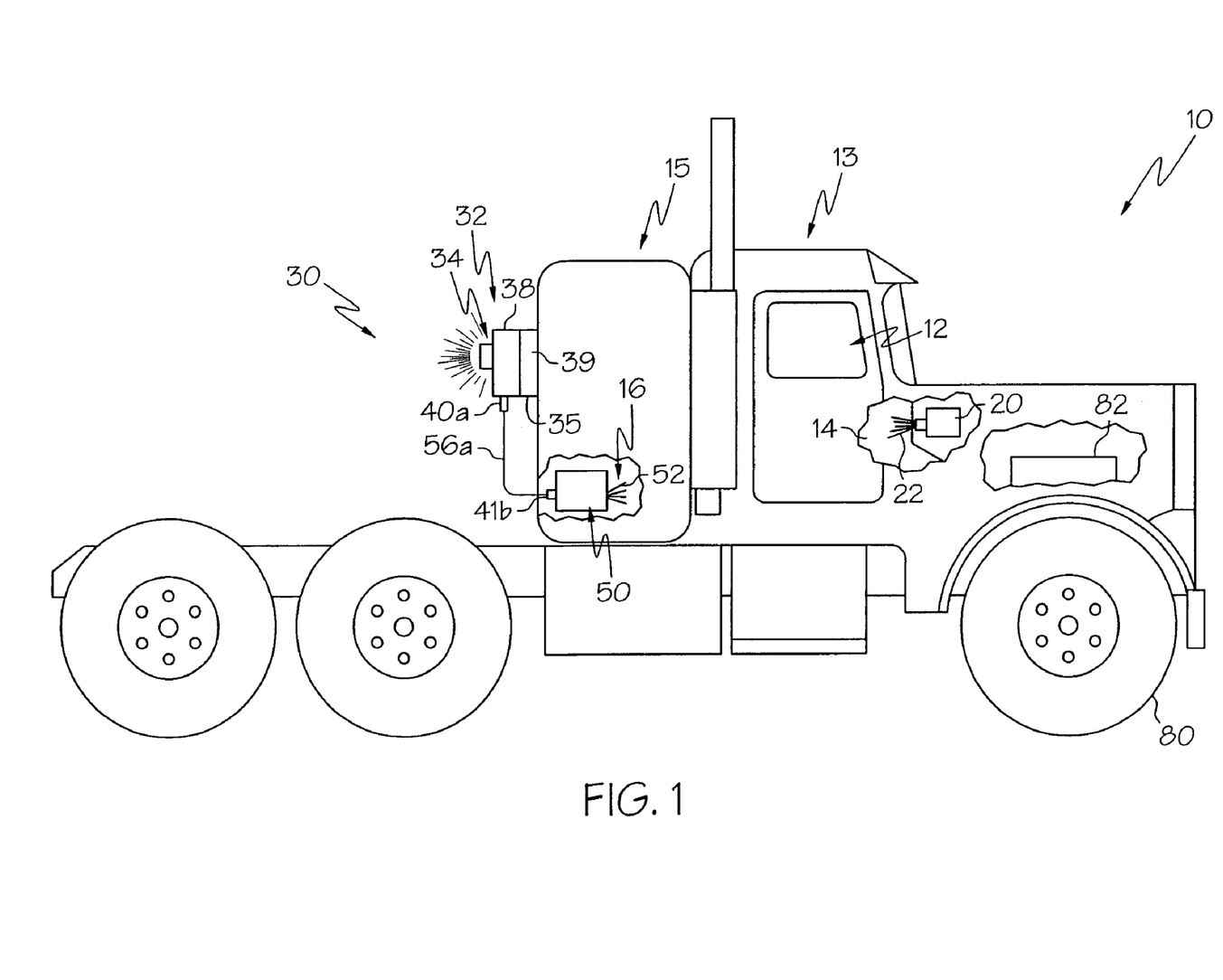
FIG. 1 is an elevational view of an example vehicle in accordance with a first embodiment of the present invention with portions broken away to depict certain features of the present invention in schematic form.

FIG. 1 depicts a vehicle 10 with portions broken away to depict features of an example embodiment of the present invention in schematic form. The vehicle 10 includes interior compartments for creature comfort. As shown, the vehicle 10 includes an interior area 12 with a driver compartment 14 and a sleeper compartment 16. In particular embodiments, the vehicle 10 might comprise a truck with a driver cab 13 including the driver compartment 14 and a sleeper cab 15 including the sleeper compartment 16. A wide range of vehicles, in addition to trucks, might comprise driver and sleeper compartments. For example, a vehicle might comprise a recreational vehicle wherein the driver compartment comprises the front seat area of the recreational vehicle and the sleeper compartment comprises a rear living area of the recreational vehicle. Vehicles might also comprise an automobile, such as a van, where the driver compartment comprises the front seat area and the sleeper compartment comprises a rear seat or rear area of the automobile. Other vehicles including a driver compartment and one or more additional sleeper compartments might also incorporate concepts of the present invention. It is to be appreciated that the phrase "sleeper compartment" is to be interpreted as a compartment that a person may occupy to sleep, rest, or otherwise occupy when not in the driver compartment.

The shown embodiments of the present invention include a first apparatus 20 adapted to provide occupant comfort air 22 (e.g., heated air, cooled air, or ventilating air) to at least the driver compartment 14. To facilitate an occupant comfort air stream, the first apparatus 20 may include a first apparatus fan 29 adapted to produce the air stream directed into at least the driver compartment 14. The present invention further includes a second apparatus 30 adapted to provide occupant comfort air 52 (e.g., heated air, cooled air, or ventilating air) to at least the sleeper compartment 16. The second apparatus 30 might also include a second apparatus fan 58 adapted to produce an occupant comfort air stream directed at least into the sleeper compartment 16.

In certain embodiments, the driver compartment 14 is segregated from the sleeper compartment 16. For example, the compartments might be independent compartments that are permanently segregated from one another, or might comprise compartments or rooms that are selectively segregated from one another with a closure, such as doors, drapes, or the like. In embodiments where the driver compartment 14 is segregated from the sleeper compartment 16, the first apparatus 20 might only or substantially be adapted to provide occupant comfort air in the driver compartment 14 and the second apparatus 30 might only or substantially be adapted to provide occupant comfort air in the sleeper compartment 16. In other examples, the first apparatus 20 and the second apparatus 30 might have the ability to provide occupant comfort air in the driver and sleeper compartments. For instance, in the absence of segregation between the driver compartment 14 and sleeper compartment 16, occupant comfort air 22 may diffuse or pass into the sleeper compartment 16 or, in the case of heating or cooling, there might be significant heat transfer between the sleeper compartment 16 and driver compartment 14. Similarly, in the absence of segregation between the driver compartment 14 and sleeper compartment 16, occupant comfort air 52 may diffuse or pass into the driver compartment 14 or there might be significant heat transfer between the driver compartment 14 and the sleeper compartment 16.

The first apparatus 20 can comprise a first air cooling unit 20a adapted to cool air at least in the driver compartment 14 of the vehicle when a power source 82 of the vehicle is operating. The first air cooling unit 20a, if provided, can include a compressor 21, a condenser coil 27, a condenser fan 26 and an evaporator coil 28. Air cooling units described throughout the application can also include a separate expansion device. For example, the illustrated first air cooling unit 20a can include an expansion device 23. Expansion devices throughout this application can comprise an expansion valve, expansion capillary tube or the like. While the illustrated embodiments throughout the application schematically depict the expansion device separately from the corresponding evaporator coil, it is contemplated that the corresponding evaporator coil might incorporate the expansion device or incorporate the functionality of the expansion device.

Figure 2:
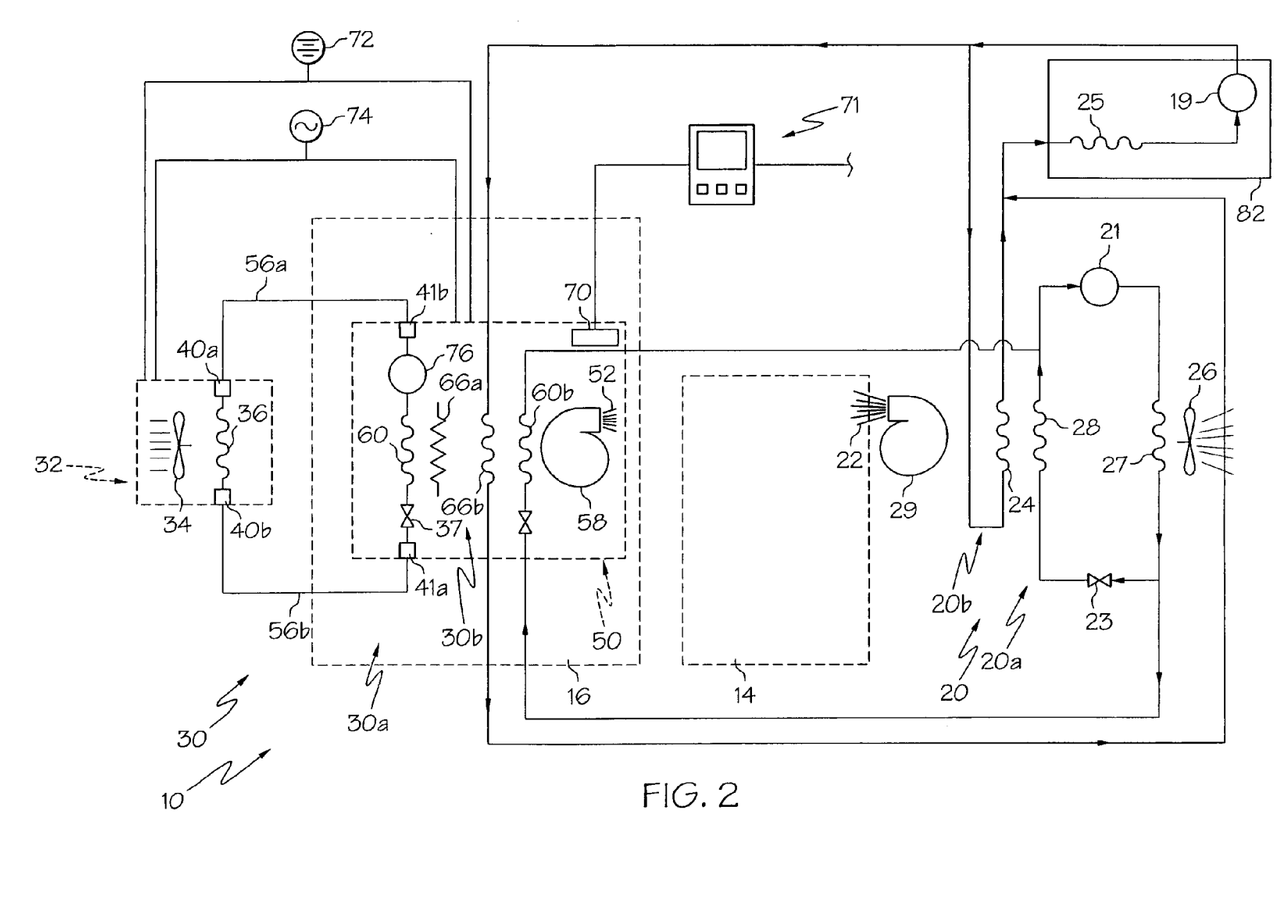
FIG. 2 is a schematic illustration of elements of the example vehicle of FIG. 1.
Figure 3:
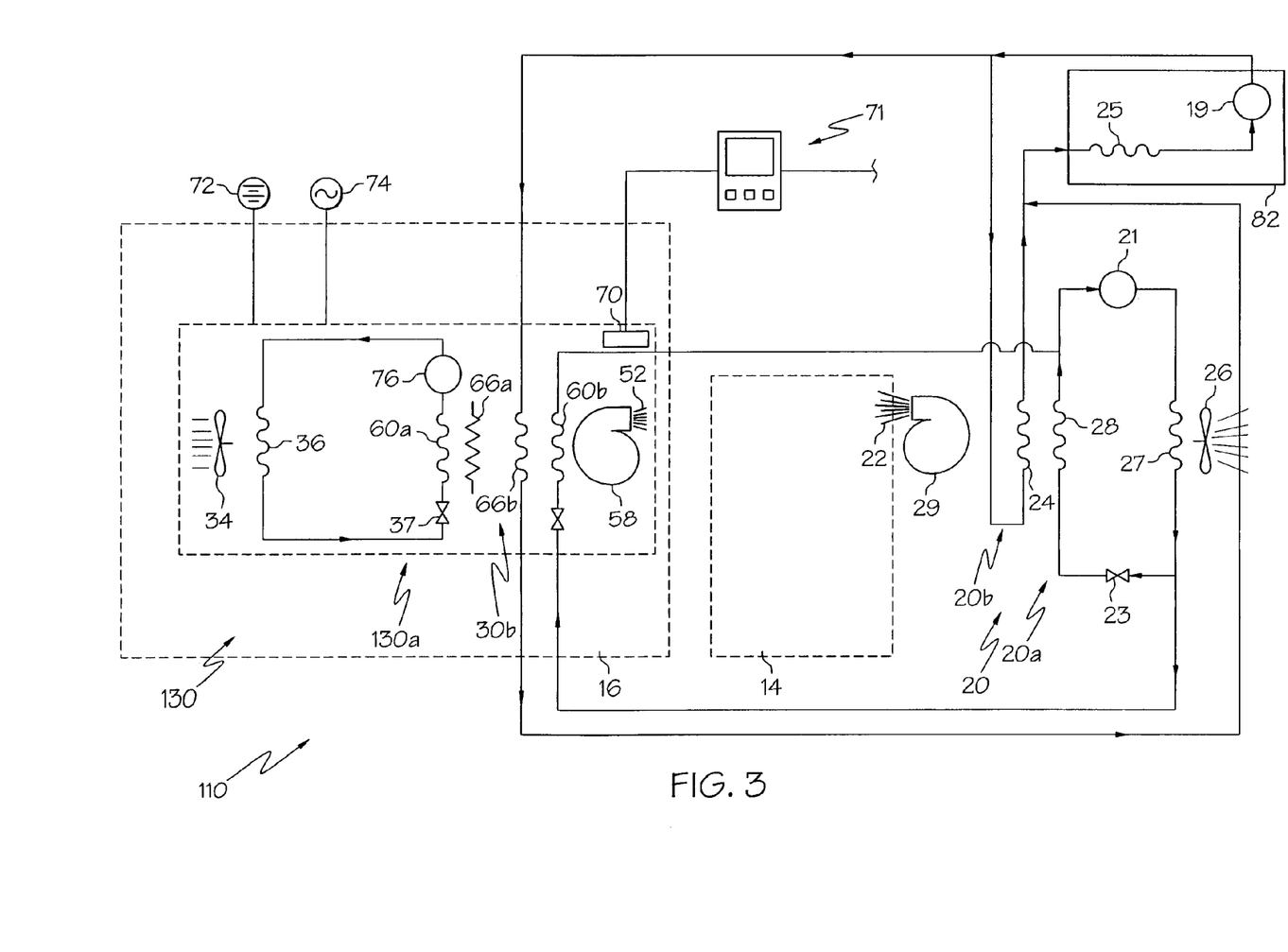
FIG. 3 is a schematic illustration of elements of another vehicle in accordance with a second example embodiment of the present invention.

The first apparatus 20 can also comprise a first heater unit 20b. In certain embodiments, the first apparatus 20 includes either the first air cooling unit 20a or the first heater unit 20b. In further embodiments, the first apparatus 20 includes both the first air cooling unit 20a and the first heater unit 20b as shown in FIGS. 2-3. The first heater unit 20b, if provided, can include a heat exchanger 24 adapted to receive waste heat from a coolant circuit 25 of the power source 82 of the vehicle 10. A fluid pump 19 can be provided that is adapted to circulate fluid through the heat exchanger 24.

The power source 82 of the vehicle 10 can comprise a combustion engine, electric motor, or the like. The power source 82 can be used to power one or more ground engaging wheels 80 and can also simultaneously power the first apparatus 20. In one example, a battery provides direct power to the first apparatus 20 and the power source 82 recharges the battery such that the power source 82 indirectly provides power to the first apparatus 20. Fuel, such as electricity or combustible fuel or the like, may be used to operate the power source 82. In a parked condition, the power source 82 is not needed to power the ground engaging wheels 80. However, if occupant comfort air is to be provided by the first apparatus 20, the power source 82 must remain in operation for directly powering the first apparatus 20 and/or continued charging of the battery for indirectly powering the first apparatus 20. For example, the power source 82 may be needed to recharge a battery that powers the first apparatus 20. In certain applications, idle running of a power source when the vehicle is parked can cause excessive wear and tear, require undue fuel consumption, and/or present an environmental concern.

As apparent in partial schematic layout in FIG. 1, the example vehicle 10 includes several of ground engaging wheels 80 with the power source 82 adapted to power the first apparatus 20 and at least one, but possibly multiple, ground engaging wheels 80. For example, the power source 82 can power the fluid pump 19, compressor 21, condenser fan 26 and the first apparatus fan 29 when the power source 82 is running. Therefore, as shown herein, the apparatus 20 can include a first air cooling unit 20a and/or a first heater unit 20b adapted to provide conditioned air (e.g., cooled or heated air) to at least the driver compartment 14 of the vehicle 10 with energy from the power source 82 at least further adapted to power the ground engaging wheels 80.

Embodiments of the present invention further include a second apparatus 30 adapted to provide occupant comfort air 52 (e.g., heated or cooled air) to at least to the sleeper compartment 16. Although possible in certain arrangements, one or more components of the second apparatus 30 do not necessarily rely on the power source 82 for power. Accordingly, it may be possible to provide occupant comfort air in the sleeper compartment 16 without running the power source 82 used to power the ground engaging wheels 80.

As shown schematically in FIG. 2, the second apparatus 30 includes a second apparatus fan 58 adapted to produce an occupant comfort air stream directed at least into the sleeper compartment 16. The second apparatus 30 further includes a first heat transfer device and a second heat transfer device that are either both adapted to heat or both adapted to cool the sleeper compartment 16. It is to be appreciated that heat transfer is intended to mean cooling or heating. Although not necessary, the second apparatus 30 might include additional heat transfer devices. For example, the second apparatus 30 might include first and second heat transfer devices that are both adapted to cool the sleeper compartment and third and fourth heat transfer devices that are both adapted to heat the sleeper compartment.

In applications where the second apparatus 30 is adapted to heat the sleeper compartment 16, the second apparatus 30 can include a second heater unit 30b with the first heat transfer device comprising an electrical heating element 66a, such as any device adapted to produce heat from electricity, and the second heat transfer device comprising another heat exchanger 66b operably connected to the fluid coolant circuit 25 of the power source. Accordingly, at least the electrical heating element 66a may be employed to provide heat to the sleeper compartment 16 when the power source 82 is not operating and at least the heat exchanger 66b of the second heater unit 30b may be employed to provide heat to the sleeper compartment 16 when the power source 82 is operating.

In example embodiments, the vehicle may include a control mechanism 70 such that it is configured to permit operation of the heat exchanger 66b of the second heater unit 30b and prevent operation of the electrical heating element 66a when the power source 82 is operating and configured to permit operation of the electrical heating element 66a and prevent operation of the heat exchanger 66b when the power source 82 is not operating. In further example embodiments, the control device 70 may be configured to permit operation of the heat exchanger 66b of the second heater unit 30b and permit operation of the electrical heating element 66a regardless of whether the power source 82 is operating.

In applications where the second apparatus 30 is adapted to cool the sleeper compartment 16, the second apparatus 30 can include a second air cooling unit 30a including an auxiliary compressor 76, an auxiliary condenser coil 36, and an auxiliary condenser fan 34. A wide variety of auxiliary condenser fans may be used with second air cooling units in accordance with the embodiments of the present invention. In example embodiments, the second cooling unit can include an auxiliary axial condenser fan to provide a compact fan design that reduces the overall size of the air conditioning assembly when compared to second cooling units including a centrifugal condenser fan. In additional example embodiments, the second cooling unit can include an auxiliary direct current condenser fan to provide more airflow and consume less power than comparable alternating current condenser fans. In further example embodiments, the second cooling unit can include an auxiliary direct current axial condenser fan, rather than an alternating current centrifugal condenser fan, to reduce the size of the assembly, enhance airflow, and reduce power requirements.

The first heat transfer device of the second apparatus comprises a first auxiliary evaporator coil 60a operably connected between the auxiliary condenser coil 36 and the auxiliary compressor 76 and the second heat transfer device comprises a second auxiliary evaporator coil 60b operably connected between the condenser coil 27 of the first apparatus 20 and the compressor 21 of the first apparatus 20. Accordingly, at least the first auxiliary evaporator coil 60a may be employed to cool the sleeper compartment 16 when the power source 82 is not operating and at least the second auxiliary evaporator coil 60b may be employed to cool the sleeper compartment 16 when the power source 82 is operating.

In example embodiments, the control device 70 may be configured to prevent operation of the first auxiliary evaporator coil 60a and permit operation of the second auxiliary evaporator coil 60b when the power source 82 is operating and can further permit operation of the first auxiliary evaporator coil 60a and prevent operation of the second auxiliary evaporator coil 60b when the power source 82 is not operating. In further embodiments, the vehicle may be configured to permit operation of the first and second auxiliary evaporator coils 60a, 60b regardless of whether the power source 82 is operating.

In applications where the second apparatus 30 is adapted to heat and cool at least the sleeper compartment, the second apparatus includes the second air cooling unit 30a and the second air heating unit 30b. At least the first auxiliary evaporator coil 60a may be employed to cool the sleeper compartment and at least the electrical heating element 66a may be used to alternatively heat the sleeper compartment when the power source 82 is not operating. In addition, at least the second auxiliary evaporator coil 60b may be employed to cool the sleeper compartment and at least the heat exchanger 66b of the second heater unit 30b may be used to provide heat to the sleeper compartment when the power source 82 is operating. In this embodiment, the control device 70 may be configured to prevent operation of the first auxiliary evaporator coil 60a and the electrical heating element 66a and permit operation of the second auxiliary evaporator coil 60b and the heat exchanger 66b of the second heater unit 30b when the power source 82 is operating. In addition, the control device 70 may be configured to permit operation of the first auxiliary evaporator coil 60a and the electrical heating element 66a and prevent operation of the second auxiliary evaporator coil 60b and the heat exchanger 66b of the second heater unit 30b when the power source 82 is not operating.

The control mechanism 70 is depicted schematically in FIGS. 2 and 3 and it is understood that various types of control mechanisms may be used to achieve the intended result of selective operation of the first and second heat transfer devices of the second apparatus based on whether the power source 82 is operating as discussed above. For example, the control mechanism may comprise a mechanical, electrical and/or mechanical/electrical arrangement to activate selected portions of the vehicle to provide appropriate heating and cooling functions. Moreover, control mechanism 70 provided in accordance with the present invention may be operably connected to a user input device 71 to permit entry of desired HVAC commands (e.g., heat, cool, etc.) for environmental control of the sleeper and/or driver compartments. The input device 71 might also have programming sequences to adjust the temperature based on the time of day and/or whether the power source 82 is operating.

As further illustrated in FIG. 2, the second air cooling unit 30*a* can include an exterior assembly 32 and an interior assembly 50 as described, for example, in U.S. patent application Ser. No. 10/927,937, filed Aug. 27, 2004, which is herein incorporated entirely by reference. The exterior assembly 32 can be mounted to a location outside the interior area 12 of the vehicle 10. For example, as shown in FIG. 1, the exterior assembly 32 can be mounted to a rear side of the sleeper cab 15. Although not shown, the exterior assembly 32 might be mounted to another side surface, a top surface or a bottom surface of the sleeper cab 15 or might be mounted at another location outside the interior area 12 of the vehicle 10.

As shown in FIG. 2, the exterior assembly 32 can comprise the auxiliary condenser coil 36 and the auxiliary condenser fan 34. The auxiliary condenser coil 36 may be positioned within an interior area of a housing 38 of the exterior assembly 32 wherein the auxiliary condenser coil 36 may be located within the housing. One or more offset brackets 35 may be provided mount the auxiliary condenser coil 36 and auxiliary condenser fan 34 to a support surface while offsetting the auxiliary condenser coil 36 from the support surface. Offsetting the auxiliary condenser coil 36 from the support surface provides an offset space 39 that permits circulation of air between the auxiliary condenser coil 36 and the support surface.

The interior area of a vehicle is often limited and it is often desired to reduce components within the interior area to enlarge the available space within the vehicle. Accordingly, locating the auxiliary condenser coil 36 and the auxiliary condenser fan 34 outside the interior area 12, reduces interior area required to house the second apparatus. Therefore, an interior and exterior assembly may be provided in applications wherein the interior area is limited such that installation of a second apparatus would otherwise be prohibited. Reducing the interior space requirements also frees additional interior space for other vehicle components that might not otherwise be installed due to excessive space requirements of a second apparatus mounted entirely within the interior area of the vehicle. Still further, a condenser fan can present a significant noise concern for the driver and other vehicle occupants. Therefore, locating the auxiliary condenser fan 34 outside the interior area 12 can significantly reduce the noise pollution within the interior area 12 of the vehicle.

The interior assembly 50 can be mounted within driver compartment 14 or the sleeper compartment 16 of the interior area 12 of the vehicle 10. In one particular embodiment, the interior assembly 50 might be mounted underneath a bed located in the sleeper compartment 16. As shown in FIG. 2, certain embodiments of the interior assembly 50 can include the first auxiliary evaporator coil 60*a*, the auxiliary compressor 76, the electrical heating element 66*a*, the heat exchanger 66*b* of the second heater unit 30*b* and the second auxiliary evaporator coil 60*b*. Including one or more of the referenced components as part of the interior assembly can prevent an oversized exterior assembly that might not be feasible in certain vehicle applications. Oversized exterior assemblies may present various installation obstacles and can increase air resistance of the vehicle. For example, an oversized exterior assembly may not fit underneath the lower wall of a sleeper cab 15. Locating an oversized exterior assembly on the roof of the sleeper cab 15 may increase the overall height of the truck above a maximum regulated height and can increase the air resistance of the vehicle. Moreover, it may not be possible to locate an oversized exterior assembly behind the sleeper cab 15 due to interference with other portions of the vehicle (e.g., a truck trailer).

In order to simplify installation, the interior and/or exterior assembly can comprise low loss quick connect inlet and outlet ports. A low loss quick connect port can comprise any joint, fitting or portion thereof that facilitates fluid connection and/or disconnection between two conduits without significant leakage of fluid to and/or from the conduits during the connection and/or disconnection process. As shown in FIG. 2, the exterior assembly 32 can comprise a first low loss quick connect inlet port 40*a* and a first low loss quick connect outlet port 40*b*. Similarly, the interior assembly 50 can comprise a second low loss quick connect inlet port 41*a* and a second low loss quick connect outlet port 41*b*.

A low loss quick connect line can also be used to operably connect the exterior assembly to the interior assembly. A low loss quick connect line can comprise any conduit adapted to connect with at least two fluid ports without significant leakage of fluid during connection and/or disconnection of the low loss quick connect line with the ports. For example, the second apparatus 30 can include a first low loss quick connect line 56*a* and a second low loss quick connect line 56*b* to operably connect the exterior assembly 32 to the interior assembly 50. The first low loss quick connect line 56*a* can operably connect the first low loss quick connect inlet port 40*a* of the exterior assembly 32 with the second low loss quick connect outlet port 41*b* of the interior assembly 50. Similarly, the second low loss quick connect line 56*b* can operably connect the second low loss quick connect inlet port 41*a* of the interior assembly 50 with the first low loss quick connect outlet port 40*b* of the exterior assembly 32.

In further embodiments, the first low loss quick connect line 56*a* and the second low loss quick connect line 56*b* can comprise a single overall line, the exterior assembly can comprise an overall port including both the low loss quick connect inlet and outlet ports of the exterior assembly, and the interior assembly can comprise an overall port including both the low loss quick connect inlet and outlet ports of the interior assembly. In one particular example embodiment, the single overall line can comprise a coaxial line with the first low loss quick connect line being coaxially aligned with the second quick connect line. Providing a single overall line may simplify operable connection of the interior assembly and the exterior assembly while minimizing the chance of potential refrigerant fluid loss. Indeed, a single overall line would only involve two connection steps, rather than four connection steps in applications where the first and second low loss quick connect lines are separate from one another.

Installation of the second apparatus 30 may be further simplified by providing the exterior and interior assembly as a kit with respective condenser and evaporator coils including precharged refrigerant fluid. Precharging the coils with refrigerant fluid reduces installation time and possible environmental spills during installation procedures. Prior to installation, the second apparatus may also be tested and optimized without requiring discharge of refrigerant material that might otherwise be necessary in applications that do not include precharged coils. Discharge of refrigerant material also requires additional preparation time and increases the likelihood of inadvertent leakage to the environment.

An example method of preparing an example air cooling kit will now be described. The exterior assembly 32 is provided with the auxiliary condenser fan 34 and the auxiliary condenser coil 36. The interior assembly 50 is also provided with the second apparatus fan 58, the auxiliary compressor 76 and the first auxiliary evaporator coil 60*a*. The auxiliary condenser coil 36 and the first auxiliary evaporator coil 60*a* can then be independently or simultaneously charged with refrigerant fluid prior to operable connection of the interior and exterior assemblies. Alternatively, the exterior assembly 32 may be operably connected to the interior assembly 50 prior to charging the system with refrigerant fluid. Once operably connected, the first auxiliary evaporator coil 60*a* and the auxiliary condenser coil 36 may be simultaneously charged with a single charging step. If desired, the second apparatus 30 may then be tested and optimized to obtain the desired specifications. The exterior assembly 32 and the interior assembly 50 may then be disconnected from one another while the respective auxiliary condenser coil 36 and the first auxiliary evaporator coil 60*a* remain charged. The use of low loss quick connect inlet and outlet ports and low loss quick connect lines may also further simplify providing a kit with precharged condenser and evaporator coils such that the precharged refrigerant fluid of the condenser coil is isolated from the precharged refrigerant fluid of the evaporator coil until subsequent operable connection of the exterior assembly with the interior assembly during installation procedures.

In further embodiments of the present invention, another vehicle 110 is provided with a second apparatus 130 that comprise a single, non-divided unit. The non-divided unit can be adapted to be positioned entirely within the interior area 12, such as the sleeper compartment of the vehicle. For example, FIG. 3 depicts an alternative embodiment including the single, non-divided second apparatus 130 wherein many elements of the vehicle have identical reference numbers and corresponding functions and features as described with respect to FIGS. 1 and 2. Moreover, the second air cooling unit 130*a* can include a coolant circuit that is not divided between an interior area and an exterior area by way of low loss quick connect inlet and outlet ports and lines. Rather, as shown, the auxiliary condenser coil 36 is directly connected between the auxiliary compressor 76 and the expansion device 37.

While components of the first apparatus 20 are adapted to be powered directly or indirectly by the power source 82, components of the second apparatus 30, 130 herein may be powered by a direct current (DC) power supply 72 or by an alternating current (AC) power supply 74. Thus, the second apparatus 30, 130 is configured to receive power from a DC power source, or alternatively, from an AC power source to provided alternative power sources for the second apparatus 30, 130. DC and AC current may be provided by a generator, fuel cell, inverter/battery pack, or by shore power, or the like. Still further, the DC or AC power supply may also be adapted to simultaneously operate the first apparatus 20 in addition to the second apparatus 30, 130 to permit conditioning of air in both the driver and sleeper compartments without operation of the power source 82.

An example method of using the apparatus will now be described with reference to one embodiment of the present invention. For instance, the first apparatus 20 can be configured to receive power directly or indirectly from a power source 82 (e.g., the engine of the vehicle). The second apparatus 30, 130 can be provided with a DC power source 72, such as a battery, that might be attached to an exterior or provided in the interior of the vehicle. Commands may be entered into the user input device 71 to provide a predetermined temperature in the driver compartment 14 when the vehicle is operating and provide a second predetermined temperature in the sleeper compartment 16 when the vehicle is not operating. Once the appropriate commands are entered in the input device 71, signals are transmitted to the first apparatus 20 to control the temperature of the driver compartment. Similarly, signals are transmitted to the control mechanism 70 such that the second apparatus 30, 130 can control the temperature in the sleeper compartment. The control mechanism can automatically switch between operational components depending on whether the power source 82 is operating. If operating, the control mechanism 70 can permit operation of heat exchanger 66*b* or the second auxiliary evaporator coil 60*b*. Once the power source 82 is deactivated, the control mechanism 70 can automatically switch to permit operation of the electrical heating element 66*a* or the first auxiliary evaporator coil 60*a* by the DC power source 72. Thereby, temperature control of the sleeper compartment can be automatically maintained regardless of whether the power source 82 is operating.

The driver compartment and sleeper compartment might be operational at the same or different temperatures when the power source 82 is operating. This setting might be particularly useful where a passenger is resting in the sleeping compartment and the driver is operating the vehicle in the driver compartment.

From the above description of the invention, those skilled in the art will perceive improvements, changes and modifications. Such improvements, changes and modifications within the skill of the art are intended to be covered by the appended claims.

What is claimed is:

1. A vehicle comprising:
an interior area including a driver compartment and a sleeper compartment;
a first apparatus adapted to provide occupant comfort air at least in the driver compartment the first apparatus including a first apparatus fan;
a ground-engaging wheel;
a power source adapted to power the first apparatus and the ground-engaging wheel when the power source is operating;
a second apparatus adapted to provide occupant comfort air at least in the sleeper compartment, the second apparatus including a first heat transfer device, a second heat transfer device and a second apparatus fan adapted to facilitate air flow with respect to the first and second heat transfer devices to provide conditioned air at least in the sleeper compartment, wherein the first and second heat transfer devices are either both adapted to heat or both adapted to cool the sleeper compartment; and
a control mechanism adapted to permit operation of the second heat transfer device and prevent operation of the first heat transfer device when the power source is operating and adapted to permit operation of the first heat transfer device and prevent operation of the second heat transfer device when the power source is not operating.

2. The vehicle of claim 1, wherein the first apparatus comprises a first air cooling unit including a compressor, a condenser coil, a condenser fan, and an evaporator coil, wherein the second apparatus comprises a second air cooling unit including an auxiliary compressor, an auxiliary condenser coil, and an auxiliary condenser fan, and wherein the first heat transfer device comprises a first auxiliary evaporator coil operably connected between the auxiliary condenser coil and the auxiliary compressor and the second heat transfer device comprises a second auxiliary evaporator coil operably connected between the condenser coil of the first apparatus and the compressor of the first apparatus.

3. The vehicle of claim 2, wherein the auxiliary condenser fan comprises a direct current axial fan.

4. The vehicle of claim 2, wherein the second apparatus includes an exterior assembly mounted to a location outside the interior area, the exterior assembly comprising the auxiliary condenser coil and the auxiliary condenser fan, the second apparatus further including an interior assembly operably connected with the exterior assembly and mounted within the interior area, the interior assembly comprising the first and second auxiliary evaporator coils, the auxiliary compressor and the second apparatus fan.

5. The vehicle of claim 4, further comprising at least one low loss quick connect refrigerant line operably connecting the interior assembly and the exterior assembly.

6. The vehicle of claim 4, wherein the interior assembly and the exterior assembly each comprise at least one low loss quick connect port.

7. The vehicle of claim 1, wherein the first apparatus comprises a first heater unit including a heat exchanger operably connected to a coolant circuit of the power source and a fluid pump adapted to circulate fluid through the heat exchanger, wherein the second apparatus comprises a second heater unit, wherein the first heat transfer device comprises an electrical heating element and the second heat transfer device comprises another heat exchanger operably connected to the coolant circuit of the power source.

8. The vehicle of claim 7, wherein the first apparatus further comprises a first air cooling unit including a compressor, a condenser coil, a condenser fan, and an evaporator coil, wherein the second apparatus further comprises a second air cooling unit including an auxiliary compressor, an auxiliary condenser coil, an auxiliary condenser fan, a first auxiliary evaporator coil operably connected between the auxiliary condenser coil and the auxiliary compressor and a second auxiliary evaporator coil operably connected between the condenser coil of the first apparatus and the compressor of the first apparatus, wherein the control mechanism is further adapted to permit operation of the second auxiliary evaporator coil and prevent operation of the first auxiliary evaporator coil when the power source is operating and adapted to permit operation of the first auxiliary evaporator coil and prevent operation of the second auxiliary evaporator coil when the power source is not operating.

9. The vehicle of claim 1, wherein the second apparatus is adapted to operate entirely on an AC power supply and wherein the second apparatus is further adapted to operate entirely on a DC power supply.

10. The vehicle of claim 1, comprising a truck.

11. The vehicle of claim 10, wherein the truck includes a driver cab and a sleeper cab connected to the driver cab.

12. The vehicle of claim 11, wherein the driver cab comprises the driver compartment and the sleeper cab comprises the sleeper compartment.

13. A vehicle comprising:
 an interior area including a driver compartment and a sleeper compartment;
 a first apparatus adapted to provide occupant comfort air at least in the driver compartment;
 a ground-engaging wheel;
 a power source adapted to power the first apparatus and the ground-engaging wheel when the power source is operating;
 a second apparatus adapted to provide occupant comfort air at least in the sleeper compartment, wherein the second apparatus is adapted to operate entirely on an AC power supply and wherein the second apparatus is further adapted to operate entirely on a DC power supply, wherein the first apparatus comprises a first air cooling unit including a compressor, a condenser coil, a condenser fan, and an evaporator coil, wherein the second apparatus comprises a second air cooling unit including an auxiliary compressor, an auxiliary condenser coil, and an auxiliary condenser fan, a first auxiliary evaporator coil operably connected between the auxiliary condenser coil and the auxiliary compressor and a second auxiliary evaporator coil operably connected between the condenser coil of the first apparatus and the compressor of the first apparatus.

14. The vehicle of claim 13, further comprising a control mechanism adapted to permit operation of the second auxiliary evaporator coil and prevent operation of the first auxiliary evaporator coil when the power source is operating and adapted to permit operation of the first auxiliary evaporator coil and prevent operation of the second auxiliary evaporator coil when the power source is not operating.

15. The vehicle of claim 13, wherein the first apparatus comprises a first heater unit including a heat exchanger operably connected to a coolant circuit of the power source, and wherein the second apparatus comprises a second heater unit comprising an electrical heating element and another heat exchanger operably connected to the coolant circuit of the power source.

16. The vehicle of claim 15, further comprising a control mechanism adapted to permit operation of the heat exchanger of the second apparatus and prevent operation of the electrical heating element when the power source is operating and adapted to permit operation of the electrical heating element and prevent operation of the heat exchanger of the second apparatus when the power source is not operating.

17. The vehicle of claim 13, comprising a truck with a driver cab including the driver compartment and a sleeper cab comprising the sleeper compartment.

18. A vehicle comprising:
 an interior area including a driver compartment and a sleeper compartment;
 a first apparatus adapted to provide occupant comfort air at least in the driver compartment, the first apparatus comprising a first heater unit including a heat exchanger and a fluid pump adapted to circulate fluid through the heat exchanger, the first apparatus further including a first air cooling unit including a compressor, a condenser coil, a condenser fan, and an evaporator coil, the first apparatus further comprising a first apparatus fan adapted to facilitate air flow with respect to the heat exchanger and the evaporator coil;
 a ground-engaging wheel;
 a power source adapted to power the fluid pump, the compressor, the condenser fan, the first apparatus fan and the ground-engaging wheel when the power source is operating, the power source including a fluid coolant circuit in fluid communication with the heat exchanger; and a second apparatus adapted to provide occupant comfort air at least in the sleeper compartment, the second apparatus comprising a second heater unit comprising an electrical heating element and another heat exchanger operably connected to the fluid coolant circuit of the power source, the second apparatus further comprising a second air cooling unit including an auxiliary compressor, an auxiliary condenser coil, an auxiliary condenser fan, a first auxiliary evaporator coil operably connected between the auxiliary condenser coil and the auxiliary compressor, and a second auxiliary evaporator coil operably connected between the condenser coil of the first apparatus and the compressor of the first apparatus, the second apparatus further including a second apparatus fan adapted to facilitate air flow with respect to the electrical heating element, the heat exchanger of the second apparatus, the first auxiliary evaporator coil and the second auxiliary evaporator coil, wherein the second apparatus fan, the electrical heating element, the auxiliary compressor and the auxiliary condenser fan are adapted to operate entirely on an AC power supply and also adapted to operate entirely on a DC power supply.

19. The vehicle of claim 18, further comprising a control mechanism adapted to permit operation of the second auxiliary evaporator coil and the heat exchanger of the second apparatus and prevent operation of the first auxiliary evaporator coil and the electrical heating element when the power source is operating; and wherein the control mechanism is further adapted to permit operation of the first auxiliary evaporator coil and the electrical heating element and prevent operation of the second auxiliary evaporator coil and the heat exchanger of the second apparatus when the power source is not operating.

* * * * *